(12) United States Patent
Schmitz et al.

(10) Patent No.: US 8,221,890 B2
(45) Date of Patent: Jul. 17, 2012

(54) MULTILAYER COMPOSITE HAVING A POLYESTER LAYER AND A PROTECTIVE LAYER

(75) Inventors: Guido Schmitz, Duelmen (DE); Harald Haeger, Freigericht (DE); Hans Ries, Marl (DE)

(73) Assignee: Evonik Degussa GmbH, Essen (DE)

( * ) Notice: Subject to any disclaimer, the term of this patent is extended or adjusted under 35 U.S.C. 154(b) by 716 days.

(21) Appl. No.: 11/240,493

(22) Filed: Oct. 3, 2005

(65) Prior Publication Data

US 2006/0083882 A1    Apr. 20, 2006

(30) Foreign Application Priority Data

Oct. 7, 2004   (DE) .......................... 10 2004 048 777

(51) Int. Cl.
| | |
|---|---|
| B32B 1/08 | (2006.01) |
| B32B 27/06 | (2006.01) |
| B32B 25/16 | (2006.01) |
| B32B 27/00 | (2006.01) |
| B32B 27/04 | (2006.01) |
| B32B 27/08 | (2006.01) |
| B32B 27/28 | (2006.01) |
| B32B 27/32 | (2006.01) |
| B32B 27/34 | (2006.01) |
| B32B 27/36 | (2006.01) |
| B32B 37/00 | (2006.01) |
| B29C 47/06 | (2006.01) |
| B29C 45/00 | (2006.01) |

(52) U.S. Cl. ................... 428/475.2; 428/34.7; 428/35.2; 428/35.7; 428/36.4; 428/36.8; 428/36.91; 428/421; 428/475.5; 428/475.8; 428/476.1; 428/480; 264/173.12; 264/173.13; 264/173.14; 264/255; 264/510

(58) Field of Classification Search ................. 428/34.1, 428/34.4, 34.6, 34.7, 35.2, 35.7, 36.4, 36.8, 428/36.9, 36.91, 421, 474.4, 475.2, 475.5, 428/475.8, 476.1, 480; 264/173.12, 173.13, 264/173.14, 255, 510

See application file for complete search history.

(56) References Cited

U.S. PATENT DOCUMENTS

| | | | |
|---|---|---|---|
| 5,258,213 A | | 11/1993 | Mügge et al. |
| 5,313,987 A | | 5/1994 | Rober et al. |
| 5,362,530 A | * | 11/1994 | Kitami et al. ............... 428/36.2 |
| 5,404,915 A | | 4/1995 | Mugge et al. |
| 5,449,024 A | | 9/1995 | Rober et al. |
| 5,460,771 A | | 10/1995 | Mitchell et al. |
| 5,474,822 A | | 12/1995 | Rober et al. |
| 5,478,620 A | | 12/1995 | Mugge et al. |
| 5,500,263 A | | 3/1996 | Rober et al. |
| 5,510,160 A | | 4/1996 | Jadamus et al. |
| 5,512,342 A | | 4/1996 | Rober et al. |
| 5,554,426 A | | 9/1996 | Rober et al. |
| 5,798,048 A | | 8/1998 | Ries |
| 5,858,492 A | | 1/1999 | Roeber et al. |
| 6,090,459 A | | 7/2000 | Jadamus et al. |
| 6,161,879 A | | 12/2000 | Ries et al. |
| 6,335,101 B1 | | 1/2002 | Haeger et al. |
| 6,355,321 B1 | | 3/2002 | Nishino et al. |
| 6,355,358 B1 | | 3/2002 | Boer et al. |
| 6,391,982 B1 | | 5/2002 | Haeger et al. |
| 6,407,182 B1 | | 6/2002 | Maul et al. |
| 6,428,866 B1 | | 8/2002 | Jadamus et al. |
| 6,446,673 B1 | * | 9/2002 | Iio et al. ..................... 138/137 |
| 6,451,395 B1 | | 9/2002 | Ries et al. |
| 6,528,137 B2 | | 3/2003 | Franosch et al. |
| 6,538,073 B1 | | 3/2003 | Oenbrink et al. |
| 6,579,581 B2 | | 6/2003 | Bartz et al. |
| 6,660,796 B2 | * | 12/2003 | Schueler et al. ............. 524/495 |
| 6,677,015 B2 | * | 1/2004 | Himmelmann et al. ..... 428/35.7 |
| 6,680,093 B1 | | 1/2004 | Ries et al. |
| 6,726,999 B2 | | 4/2004 | Schueler et al. |
| 6,766,091 B2 | | 7/2004 | Beuth et al. |
| 6,783,821 B2 | | 8/2004 | Ries et al. |
| 6,793,997 B2 | | 9/2004 | Schmitz |
| 6,794,048 B2 | | 9/2004 | Schmitz et al. |
| 7,025,842 B2 | | 4/2006 | Monsheimer et al. |
| 2001/0018105 A1 | | 8/2001 | Schmitz et al. |
| 2002/0104575 A1 | | 8/2002 | Nishi et al. |
| 2002/0142118 A1 | | 10/2002 | Schmitz et al. |
| 2003/0035914 A1 | | 2/2003 | Nishi et al. |
| 2003/0072987 A1 | | 4/2003 | Ries et al. |
| 2003/0124281 A1 | | 7/2003 | Ries et al. |

(Continued)

FOREIGN PATENT DOCUMENTS

DE         43 36 289 A1       4/1995

(Continued)

OTHER PUBLICATIONS

U.S. Appl. No. 11/246,274, filed Oct. 11, 2005, Schmitz, et al.

(Continued)

Primary Examiner — Walter B Aughenbaugh
(74) Attorney, Agent, or Firm — Oblon, Spivak, McClelland, Maier & Neustadt, L.L.P.

(57) ABSTRACT

A multilayer composite which has improved adhesion between the layers, with the following layers:

I. an inner layer I selected from among a fluoropolymer molding composition and a polyolefin molding composition;

II. a bonding layer II which has the following composition:
  a) from 2 to 80 parts by weight of a polyamine-polyamide graft copolymer,
  b) from 0 to 85 parts by weight of a polyester,
  c) from 0 to 85 parts by weight of a polymer selected from among polyamides, fluoropolymers and polyolefins,
  where the sum of the parts by weight of a), b) and c) is 100;
  d) not more than 50 parts by weight of additives;

III. a layer III of a polyester molding composition.

20 Claims, No Drawings

U.S. PATENT DOCUMENTS

| | | |
|---|---|---|
| 2003/0148125 A1 | 8/2003 | Inaba et al. |
| 2003/0212174 A1 | 11/2003 | Peirick et al. |
| 2004/0140668 A1 | 7/2004 | Monsheimer et al. |
| 2004/0202908 A1 | 10/2004 | Schmitz et al. |
| 2004/0265527 A1 | 12/2004 | Schmitz et al. |
| 2006/0100323 A1 | 5/2006 | Schmidt et al. |
| 2006/0141188 A1 | 6/2006 | Schmitz et al. |
| 2006/0281873 A1 | 12/2006 | Alting et al. |
| 2009/0044906 A1 | 2/2009 | Goring et al. |
| 2009/0286096 A1 | 11/2009 | Alting et al. |

FOREIGN PATENT DOCUMENTS

| | | |
|---|---|---|
| EP | 0 509 211 A2 | 10/1992 |
| EP | 0 569 681 A1 | 11/1993 |
| EP | 0 637 509 A1 | 2/1995 |
| EP | 0 637 511 A1 | 2/1995 |
| EP | 0 673 762 A2 | 9/1995 |
| EP | 0 726 293 A1 | 8/1996 |
| EP | 0 992 518 A1 | 4/2000 |
| EP | 1 065 048 A2 | 1/2001 |
| EP | 1 333 211 A1 | 8/2003 |
| JP | 10-311461 | 11/1998 |
| WO | 97/28394 | 8/1997 |

OTHER PUBLICATIONS

U.S. Appl. No. 11/246,206, filed Oct. 11, 2005, Schmitz, et al.
U.S. Appl. No. 07/833,701, filed Feb. 11, 1992, Mugge, et al.
U.S. Appl. No. 08/187,891, filed Jan. 28, 1994, Boer, et al.
U.S. Appl. No. 08/609,612, filed Mar. 1, 1996, Jadamus, et al.
U.S. Appl. No. 10/580,194, filed May 23, 2006, Kuhmann, et al.
U.S. Appl. No. 10/588,487, filed Aug. 4, 2006, Schmitz, et al.
U.S. Appl. No. 10/589,264, filed Aug. 14, 2006, Wursche, et al.
U.S. Appl. No. 11/586,526, filed Oct. 26, 2006, Wursche, et al.
U.S. Appl. No. 11/685,283, filed Mar. 13, 2007, Dowe, et al.
U.S. Appl. No. 11/816,595, filed Aug. 17, 2007, Haeger, et al.
U.S. Appl. No. 11/816,588, filed Aug. 17, 2007, Haeger, et al.
U.S. Appl. No. 11/816,556, filed Aug. 17, 2007, Wursche, et al.
U.S. Appl. No. 11/813,103, filed Jun. 29, 2007, Baumann, et al.
U.S. Appl. No. 12/438,142, filed Feb. 20, 2009, Luetzeler, et al.
U.S. Appl. No. 12/438,364, filed Feb. 23, 2009, Luetzeler, et al.
U.S. Appl. No. 12/373,547, filed Jan. 13, 2009, Luetzeler, et al.
U.S. Appl. No. 12/515,543, filed May 20, 2009, Wursche, et al.

* cited by examiner

MULTILAYER COMPOSITE HAVING A POLYESTER LAYER AND A PROTECTIVE LAYER

BACKGROUND OF THE INVENTION

1. Field of the Invention

The invention relates to a multilayer composite which has a barrier layer comprising a thermoplastic polyester and a protective layer comprising a material which acts as a barrier to alcohols and is selected from among a fluoropolymer and a polyolefin.

2. Description of the Related Art

In the development of multilayer composites which are used, for example, as pipes for conveying liquid or gaseous media in motor vehicles, molding compositions used have to have a sufficient chemical resistance toward the media to be conveyed and the pipes have to meet all the relevant mechanical requirements even after long-term exposure to fuels, oils or heat. Apart from the requirement of a satisfactory fuel resistance, the automobile industry demands an improved barrier action of the fuel lines in order to reduce the emissions of hydrocarbons into the environment. This has led to the development of multilayer pipe systems in which, for example, a thermoplastic polyester is used as barrier layer material. Such systems are described, for example, in EP-A-0 509 211, EP-A-0 569 681 and EP-A-1 065 048. However, these known pipe systems have the disadvantage that polyester molding compositions are susceptible to alcoholysis and hydrolysis and can lose their good mechanical strength as time goes on when alcohol-containing fuel is used.

To solve this problem, EP-A-0 637 509 proposes incorporating a fluoropolymer layer as the innermost layer to protect the polyester layer from water and alcohols. The fluoropolymer layer and the polyester layer are joined to one another by means of a bonding agent. Bonding agents disclosed are mixtures comprising firstly a fluoropolymer, flexible fluoropolymer or fluororubber and, secondly, a crystalline polyester or a polyester elastomer. In addition, a thermoplastic polyurethane, a polyamide elastomer, a modified polyolefin or a "miscibilizer" having, for example, epoxy, acid anhydride, oxazoline, isocyanate, carboxyl or amino groups can be present. However, it is not demonstrated whether this achieves any adhesion at all, apart from permanent adhesion. Due to the constituents disclosed, some of which are soluble in fuels, these bonding agents do not have a satisfactory fuel resistance. In addition, the teachings of EP-A-0 637 509 in this respect cannot readily be reproduced by a person skilled in the art on the basis of the very general information therein.

Another technical solution is described in DE-A 43 36 289. There, the polyester layer and the internal fluoropolymer layer are joined to one another by means of two successive bonding layers. However, such complex systems are expensive to produce.

As a modification thereof, a polyolefinic inner layer is also able to protect a polyester layer against the action of water and alcohol. However, there is also the problem here that satisfactory adhesion has to be achieved.

It is accordingly an object of the invention to develop a bonding agent which makes good adhesion between the polyester layer and the protective layer possible. A further object was to make adhesion which is not impaired by contact with fuel possible. Furthermore, the adhesion should be retained to a sufficient extent during the operating life of the composite. Overall, a very simple technical solution is desirable.

SUMMARY OF THE INVENTION

These objects are achieved by a multilayer composite comprising the following layers:

I. an inner layer I selected from among an unmodified or adhesion-modified fluoropolymer molding composition and an unmodified or adhesion-modified polyolefin molding composition;

II. a bonding layer II which has the following composition:
  a) from 2 to 80 parts by weight of a graft copolymer prepared using the following monomers:
    from 0.5 to 25% by weight, based on the graft copolymer, of a polyamine having at least 4 nitrogen atoms, and
    polyamide-forming monomers selected from among lactams, ω-aminocarboxylic acids and equimolar combinations of diamine and dicarboxylic acid;
  b) from 0 to 85 parts by weight of a polyester,
  c) from 0 to 85 parts by weight of a polymer selected from among polyamides, fluoropolymers and polyolefins,
  where the sum of the parts by weight of a), b) and c) is 100;
  d) not more than 50 parts by weight of additives selected from among impact-modifying rubber and customary auxiliaries and additives;

III. a layer III of a polyester molding composition.

The multilayer composite is generally a pipe or a hollow body.

DETAILED DESCRIPTION OF THE INVENTION

The multilayer composite of the present invention comprises the following layers:

I. an inner layer I selected from among an unmodified or adhesion-modified fluoropolymer molding composition and an unmodified or adhesion-modified polyolefin molding composition;

II. a bonding layer II which has the following composition:
  a) from 2 to 80 parts by weight, preferably from 4 to 60 parts by weight and particularly preferably from 6 to 40 parts by weight, of a graft copolymer prepared using the following monomers:
    from 0.5 to 25% by weight, based on the graft copolymer, of a polyamine having at least 4, preferably at least 8 and particularly preferably at least 11 nitrogen atoms and a number average molecular weight $M_n$ of preferably at least 146 g/mol, particularly preferably at least 500 g/mol and very particularly preferably at least 800 g/mol, and
    polyamide-forming monomers selected from among lactams, ω-aminocarboxylic acids and equimolar combinations of diamine and dicarboxylic acid;
  b) from 0 to 85 parts by weight, preferably from 10 to 75 parts by weight and particularly preferably from 25 to 65 parts by weight, of a polyester,
  c) from 0 to 85 parts by weight, preferably from 5 to 75 parts by weight, particularly preferably from 10 to 65 parts by weight and very particularly preferably from 20 to 55 parts by weight, of a polymer selected from among polyamides, fluoropolymers and polyolefins,
  where the sum of the parts by weight of a), b) and c) is 100;
  d) not more than 50 parts by weight, preferably not more than 30 parts by weight and particularly preferably not more than 20 parts by weight, of additives selected from among impact-modifying rubber and customary auxiliaries and additives;

III. a layer III of a polyester molding composition.

The fluoropolymer used for layer I can be, for example, a polyvinylidene fluoride (PVDF), an ethylene-tetrafluoroethylene copolymer (ETFE), an ETFE modified with a third component such as propene, hexafluoropropene, vinyl fluoride or vinylidene fluoride (for example EFEP), an ethylenechlorotrifluoroethylene copolymer (E-CTFE), a poly-chlorotrifluoroethylene (PCTFE), a tetrafluoroethylene-hexafluoropropene-vinylidene fluoride copolymer (THV), a tetrafluoroethylene-hexafluoropropene copolymer (FEP) or a tetrafluoroethylene-perfluoroalkyl vinyl ether copolymer (PFA).

If the bonding agent of layer II itself does not contain a fluoropolymer in a sufficient amount, the fluoropolymer of layer I is preferably adhesion-modified, i.e. functional groups which can react with amino groups of the bonding agent and thus make bonding of the phases possible are present. Such adhesion modification can generally be achieved in two ways, either the fluoropolymer contains built-in functional groups, for example acid anhydride groups or carbonate groups, as described in U.S. Pat. No. 5,576,106, US-A-2003148125, US-A-2003035914, US-A-2002104575, JP-A-10311461, EP-A-0 726 293, EP-A-0 992 518 or WO 9728394;

or the fluoropolymer molding composition comprises a polymer which bears functional groups and is miscible or at least compatible with the fluoropolymer. Such systems are disclosed, for example, in EP-A-0 637 511 or the equivalent U.S. Pat. No. 5,510,160 and in EP-A-0 673 762 or the equivalent U.S. Pat. No. 5,554,426, which are hereby expressly incorporated by reference.

The modified fluoropolymer of EP-A-0 673 762 comprises from 97.5 to 50% by weight, preferably from 97.5 to 80% by weight and particularly preferably from 96 to 90% by weight, of PVDF and from 2.5 to 50% by weight, preferably from 2.5 to 20% by weight and particularly preferably from 4 to 10% by weight, of an acrylate copolymer, comprising at least the following building blocks:
i) from 14 to 85% by weight of ester building blocks,
ii) from 0 to 75% by weight of imide building blocks,
iii) from 0 to 15% by weight of carboxylic acid building blocks and
iiii) from 7 to 20 parts by weight of carboxylic anhydride building blocks.

For further details, reference may be made to the documents incorporated by reference, whose contents are expressly incorporated into the disclosure of the present patent application.

The polyolefin which is used as an alternative in the layer I is preferably a polyethylene, in particular a high density polyethylene (HDPE) or an isotactic polypropylene. The polypropylene can be a homopolymer or copolymer, for example a copolymer with ethylene or 1-butene as comonomer, with both random and block copolymers being able to be used. Furthermore, the polypropylene can also be impact-modified, for example with ethylene-propylene rubber (EPM) or EPDM as described in the prior art.

When the bonding agent of the layer II itself does not contain a polyolefin in a sufficient amount, the polyolefin of the layer I is also preferably adhesion-modified in the sense that functional groups which can react with amino groups of the bonding agent are present. Suitable functional groups are preferably carboxyl groups, carboxylic anhydride groups, carbonate groups, acyllactam groups, oxazoline groups, oxazine groups, oxazinone groups, carbodiimide groups or epoxide groups.

The functional groups are, as described in the prior art, grafted onto the polyolefin chain by reaction with olefinically unsaturated functional compounds such as acrylic acid, maleic acid, fumaric acid, monobutyl maleate, maleic anhydride, aconitic anhydride, itaconic anhydride or vinyloxazoline, generally with the aid of a free-radical initiator and/or thermally, or they are incorporated into the main chain by free-radical copolymerization of the olefinically unsaturated functional compounds with the olefin.

In the graft copolymer of component II.a), the amino group concentration is preferably in the range from 100 to 2500 mmol/kg.

As polyamine, it is possible to use, for example, the following classes of substances:
polyvinyl amines (Römpp Chemie Lexikon, 9th edition, volume 6, page 4921, Georg Thieme Verlag Stuttgart 1992);
polyamines prepared from alternating polyketones (DE-A 196 54 058);
dendrimers such as
  $((H_2N-(CH_2)_3)_2N-(CH_2)_3)_2-N(CH_2)_2-N((CH_2)_2-N((CH_2)_3-NH_2)_2)_2$ (DE-A-196 54 179) or
  tris(2-aminoethyl)amine, N,N-bis(2-aminoethyl)-N', N'-bis[2-[bis(2-aminoethyl)amino]ethyl]-1,2-ethanediamine, 3,15-bis(2-aminoethyl)-6,12-bis[2-[bis(2-aminoethyl)amio]ethyl]-9-[2-[bis[2-bis(2-aminoethyl)amino]ethyl]amino]ethyl]-3,6,9,12,15-pentaazaheptadecane-1,17-diamine (J. M. Warakomski, Chem. Mat. 1992, 4, 1000-1004);
linear polyethylenimines which can be prepared by polymerization of 4,5-dihydro-1,3-oxazoles and subsequent hydrolysis (Houben-Weyl, Methoden der Organischen Chemie, volume E20, pages 1482-1487, Georg Thieme Verlag Stuttgart, 1987);
branched polyethylenimines which are obtainable by polymerization of aziridines (Houben-Weyl, Methoden der Organischen Chemie, volume E20, pages 1482-1487, Georg Thieme Verlag Stuttgart, 1987) and generally have the following amino group distribution:
  from 25 to 46% of primary amino groups,
  from 30 to 45% of secondary amino groups and
  from 16 to 40% of tertiary amino groups.

In the preferred case, the polyamine has a number average molecular weight $M_n$ of not more than 20 000 g/mol, particularly preferably not more than 10 000 g/mol and very particularly preferably not more than 5000 g/mol.

Lactams or ω-aminocarboxylic acids which can be used as polyamide-forming monomers contain from 4 to 19, in particular from 6 to 12, carbon atoms. Particular preference is given to using ε-caprolactam, ε-aminocaproic acid, caprylolactam, ω-aminocaprylic acid, laurolactam, 12-aminododecanoic acid and/or 11-aminoundecanoic acid.

Combinations of diamine and dicarboxylic acid are, for example, hexamethylene diamine/adipic acid, hexamethylenediamine/dodecanedioic acid, octamethylenediamine/sebacic acid, decamethylenediamine/sebacic acid, decamethylenediamine/dodecanedioic acid, dodecamethylenediamine/dodecanedioic acid and dodecamethylenediamine/2,6-naphthalenedicarboxylic acid. However, all other combinations such as decamethylenediamine/dodecanedioic acid/terephthalic acid, hexamethylenediamine/adipic acid/terephthalic acid, hexamethylenediamine/adipic acid/caprolactam, decamethylenediamine/dodecanedioic acid/11-aminoundecanoic acid, decamethylenediamine/dodecanedioic acid/laurolactam, decamethylenediamine/terephthalic acid/laurolactam or dodecamethylenediamine/2,6-naphthalenedicarboxylic acid/laurolactam can also be used.

In a preferred embodiment, the graft copolymer is prepared with additional use of an oligocarboxylic acid selected from among about 0.015 to about 3 mol % of dicarboxylic acid and about 0.01 to about 1.2 mol % of tricarboxylic acid, in each case based on the sum of the other polyamide-forming monomers. In determining this ratio, each of the monomers in the case of an equivalent combination of diamine and dicarboxylic acid is considered individually. As a result, the polyamide-forming monomers have an overall slight excess of carboxyl groups. If a dicarboxylic acid is used, preference is given to using from 0.03 to 2.2 mol %, particularly preferably from 0.05 to 1.5 mol %, very particularly preferably from 0.1 to 1 mol % and in particular from 0.15 to 0.65 mol %; if a tricarboxylic acid is used, preference is given to employing from 0.02 to 0.9 mol %, particularly preferably from 0.025 to 0.6 mol %, very particularly preferably from 0.03 to 0.4 mol % and in particular from 0.04 to 0.25 mol %. The concomitant use of the oligocarboxylic acid significantly improves the solvent and fuel resistance, in particular the resistance to hydrolysis and alcoholysis and the environmental stress cracking resistance, but also the swelling behavior and, associated therewith, the dimensional stability and also the barrier action against diffusion.

As oligocarboxylic acid, it is possible to use any dicarboxylic or tricarboxylic acid having from 6 to 24 carbon atoms, for example, adipic acid, suberic acid, azelaic acid, sebacic acid, dodecanedioic acid, isophthalic acid, 2,6-naphthalenedicarboxylic acid, cyclohexane-1,4-dicarboxylic acid, trimesic acid and/or trimellitic acid.

In addition, aliphatic, alicyclic, aromatic, araliphatic and/or alkylaryl-substituted monocarboxylic acids having from 3 to 50 carbon atoms, e.g. lauric acid, unsaturated fatty acids, acrylic acid or benzoic acid, can, if desired, be used as regulators. The concentration of amino groups can be reduced by means of these regulators without altering the geometry of the molecules. In addition, functional groups such as double or triple bonds, etc., can be introduced in this way. However, it is desirable for the graft copolymer to have a substantial proportion of amino groups. The amino group concentration of the graft copolymer is particularly preferably in the range from 150 to 1500 mmol/kg, in particular in the range from 250 to 1300 mmol/kg and very particularly preferably in the range from 300 to 1100 mmol/kg. Here and in the following, the term amino groups encompasses not only terminal amino groups but also any secondary or tertiary amine functions of the polyamine which may be present.

The preparation of these graft copolymers is described in greater detail in EP-A-1 065 048.

Possible polyesters of the component II.b) and of the layer III are thermoplastic polyesters having a linear structure. These are prepared by polycondensation of diols with dicarboxylic acid or polyester-forming derivatives thereof, e.g. dimethyl esters. Suitable diols have the formula HO—R—OH, where R is a divalent, branched or unbranched aliphatic and/or cycloaliphatic radical having from 2 to 40, preferably from 2 to 12, carbon atoms. Suitable dicarboxylic acids have the formula HOOC—R'—COOH, where R' is a divalent aromatic radical having from 6 to 20, preferably from 6 to 12, carbon atoms.

Examples of diols are ethylene glycol, trimethylene glycol, tetramethylene glycol, hexamethylene glycol, neopentyl glycol, cyclohexanedimethanol and the C36-diol dimerdiol. The diols can be used alone or as a mixture of diols.

Up to 25 mol % of the abovementioned diol can be replaced by a polyalkylene glycol having the general formula,

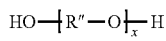

where R" is a divalent radical having from 2 to 4 carbon atoms and x can have a value in the range from 2 to 50.

Possible aromatic dicarboxylic acids are, for example, terephthalic acid, isophthalic acid, 1,4-, 1,5-, 2,6- or 2,7-naphthalenedicarboxylic acid, diphenic acid and bis(4-carboxylphenyl) ether. Up to 30 mol % of these dicarboxylic acids can be replaced by aliphatic or cycloaliphatic dicarboxylic acids such as succinic acid, adipic acid, sebacic acid, dodecanedioic acid or cyclohexane-1,4-dicarboxylic acid.

Examples of suitable polyesters are polyethylene terephthalate, polypropylene terephthalate, polybutylene terephthalate, polyethylene 2,6-naphthalate, polypropylene 2,6-naphthalate and polybutylene 2,6-naphthalate. In principle, the polyester of layer III and the polyester of component II b) can be of the same type. If this is not the case, preference is given to choosing polyesters which are compatible with one another.

Preparation of these polyesters has been described in, for example, DE-A 24 07 155, 24 07 156; Ullmanns Encyclopädie der technischen Chemie, 4th edition, vol. 19, page 65 ff., Verlag Chemie, Weinheim, 1980.

The polyester molding composition can comprise either one of these polyesters or a plurality thereof as a mixture. Furthermore, up to 40% by weight of other thermoplastics can be present, as long as these do not interfere with the bonding capability, in particular impact-modifying rubbers. Furthermore, the polyester molding composition can further comprise the auxiliaries and additives customary for polyesters, e.g. flame retardants, stabilizers, processing aids, fillers, in particular the fillers to improve the electrical conductivity, reinforcing fibers, pigments or the like. The amount of these substances should be such that the desired properties are not seriously impaired.

Suitable polyamides for component II.c) are first and foremost aliphatic homopolyamides and copolyamides, for example PA 46, PA 66, PA 68, PA 612, PA 88, PA 810, PA 1010, PA 1012, PA 1212, PA 6, PA 7, PA 8, PA 9, PA 10, PA 11 and PA 12. (The designation of the polyamides corresponds to the international standard, with the first digit(s) indicating the number of carbon atoms in the starting diamine and the last digit(s) indicating the number of carbon atoms in the dicarboxylic acid. If only one number is given, this means that an α,ω-aminocarboxylic acid or the lactam derived therefrom has been used as starting material; otherwise, reference may be made to H. Domininghaus, Die Kunststoffe und ihre Eigenschaften, pages 272 ff., VDI-Verlag, 1976.)

If copolyamides are used, these can comprise, for example, adipic acid, sebacic acid, suberic acid, isophthalic acid, terephthalic acid, naphthalene-2,6-dicarboxylic acid, etc., as coacid and bis(4-aminocyclohexyl)methane, trimethylhexamethylenediamine, hexamethylenediamine or the like as codiamine. Lactams such as caprolactam or laurolactam and aminocarboxylic acids such as 11-aminoundecanoic acid can likewise be incorporated as cocomponents.

The preparation of these polyamides is known (e.g. D. B. Jacobs, J. Zimmermann, Polymerization Processes, pp. 424-467, Interscience Publishers, New York, 1977; DE-B-21 52 194).

Further suitable polyamides are mixed aliphatic/aromatic polycondensates as are described, for example, in the U.S. Pat. Nos. 2,071,250, 2,071,251, 2,130,523, 2,130,948, 2,241, 322, 2,312,966, 2,512,606 and 3,393,210 and in Kirk-Othmer, Encyclopedia of Chemical Technology, 3rd edition, vol. 18, pages 328 ff. and 435 ff., Wiley & Sons, 1982. Poly(ether ester amides) or poly(ether amides) are also suitable as polyamides; such products are described, for example, in DE-A 25 23 991, 27 12 987 and 30 06 961.

The polyamide end groups are not subject to any restrictions. However, the best results are generally obtained when more than 50% of the end groups are amino end groups.

As fluoropolymer and as polyolefin, which can optionally be present as a constituent of the component II.c), it is possible to use the same compounds as for the layer I. When the layer I comprises a fluoropolymer molding composition, the component II.c) can likewise comprise a fluoropolymer, preferably of the same type, while the use of a polyolefin in the component II.c) does not improve adhesion of the layers in this case.

In an analogous way, when the layer I comprises a polyolefin molding composition, the component II.c) can likewise comprise a polyolefin, preferably of the same type, while the use of a fluoropolymer in the component II.c) does not improve adhesion of the layers in this case.

The fluoropolymer or the polyolefin which is optionally present in the component II.c) is preferably adhesion-modified as described above. In this case, adhesion-modification of the molding composition of layer I can be dispensed with.

As additives for the component II.d) it is possible to use the same ones as described for the polyester molding composition of layer III.

Apart from the layers I to III, further layers, for example a layer V which comprises a polyamide molding composition or a polyolefin molding composition and is joined to the layer III via a suitable bonding agent (layer IV), can additionally be present in the composite of the invention. Bonding agents suitable for this purpose are prior art. Furthermore, this polyamide or polyolefin layer can be adjoined by a sheath or envelope of a rubber or a thermoplastic elastomer. A further, innermost fluoropolymer or polyolefin layer can equally well adjoin the inner layer I.

In one embodiment, the multilayer composite further comprises a regrind layer. In the production of composites according to the invention, the scrap is obtained time and again, for example from the start-up of the extrusion plant or in the form of flash from extrusion blown molding or else in the manufacture of pipes. A regrind layer derived from this scrap is embedded between two other layers so that any brittleness of the regrind blend is compensated as far as possible.

The multilayer composite of the invention is, for example, a pipe, a filling port or a container, in particular for conveying or storing liquids or gases. Such a pipe can be smooth or corrugated or only corrugated in subsections. Corrugated pipes such as those described in e.g. U.S. Pat. No. 5,460,771, can be used. Important uses of such multilayer composites are the use as fuel line, as tank filling port, as vapor line (i.e. line in which fuel vapors are conveyed, e.g. breather lines), as filling station line, as cooling fluid line, as air conditioner line or as fuel container, for instance a canister or a tank.

When the multilayer composite of the invention is used for conveying or storing flammable liquids, gases or dusts, e.g. fuel or fuel vapors, it is advisable to make one of the layers of the composite or an additional inner layer electrically conductive. This can be achieved by compounding with an electrically conductive additive using all methods of the prior art. As conductive additive, it is possible to use, for example, conductive carbon black, metal flakes, metal powder, metallized glass spheres, metallized glass fibers, metal fibers (for example stainless steel fibers), metallized whiskers, carbon fibers (including metallized carbon fibers), intrinsically conductive polymers or graphite fibrils. It is also possible to use mixtures of various conductive additives.

In the preferred case, the electrically conductive layer is in direct contact with the medium to be conveyed or stored and has a surface resistance of not more than $10^9$ $\Omega$/square and preferably not more than $10^6$ $\Omega$/square. The method of determining the resistance of multilayer pipes is described in SAE J 2260 (November 1996, Paragraph 7.9).

The multilayer composite can be produced in one or more stages, for example by single-stage multicomponent injection-molding processes, coextrusion, coextrusion blow molding (for example 3D blow molding, parison extrusion into an opened mold half, 3D parison manipulation, suction blow molding, 3D suction blow molding, sequential blow molding), or by multistage processes such as coating.

Having generally described this invention, a further understanding can be obtained by reference to certain specific examples which are provided herein for purposes of illustration only and are not intended to be limiting unless otherwise specified.

In the examples, the following molding compositions were used:

Inner Layer (Layer I):

Fluoropolymer 1: Mixture as described in EP-A-0 673 762 of 95% by weight of a commercial PVDF and 5% by weight of a polyglutarimide made up of the following building blocks:
57% by weight derived from methyl methacrylate,
30% by weight of N-methylglutarimide type,
3% by weight derived from methacrylic acid and
10% by weight of the glutaric anhydride type (prepared by reaction of polymethyl methacrylate with an aqueous solution of methylamine in the melt).

Fluoropolymer 2: NEOFLON® RP 5000 from Daikin Industries Ltd., Japan, a modified EFEP Fluoropolymer 3: NEOFLON® RP 5000 AS from Daikin Industries Ltd., Japan, a modified EFEP which has been made electrically conductive Polyolefin 1: STAMYLAN® P 83 MF 10, a PP copolymer from DSM Deutschland GmbH Polyolefin 2: VESTOLEN® A 6013, an HDPE from DSM Deutschland GmbH Bonding Agent (Layer II and IV):

Preparation of the Graft Copolymer:

9.5 kg of laurolactam were melted at 180° C.-210° C. in a heating vessel and transferred to a pressure-rated polycondensation vessel; 475 g of water and 0.54 g of hypophosphorous acid was subsequently added. The cleavage of the lactam was carried out at 280° C. under the autogenous pressure; the vessel was then depressurized to a residual vapor pressure of 5 bar over a period of three hours and 500 g of polyethylenimine (LUPASOL G 100 from BASF AG, Ludwigshafen) and 15 g of dodecanedioic acid were added. Both components were incorporated under the autogenous pressure; the vessel was subsequently depressurized to atmospheric pressure and nitrogen was then passed over the melt at 280° C. for two hours. The clear melt was discharged as a strand by means of a melt pump, cooled in a water bath and subsequently pelletized.

BA 1: 12.6 kg of a PA12 ($\eta$rel=2.1), 22.82 kg of VESTODUR® 3000 (homopolybutylene terephthalate from Degussa AG having a solution viscosity J of 165 cm3/g) and 5.0 kg of the graft copolymer were melt-mixed on a twin-screw kneader ZE 25 33D from Berstorff at 270° C. and 150 rpm and a throughput of 10 kg/h, extruded and pelletized.

BA 2: Same as BA 1, except that PA12 was replaced by polypropylene grafted with maleic anhydride (ADMER® QB 520 E from Mitsui Chemicals Inc., Japan)

BA 3: Same as BA 1, except that the PA12 was replaced by polyethylene grafted with maleic anhydride (ADMER® NF 408 E of Mitsui Chemicals Inc., Japan)

Polyester Layer (Layer III):
PEL: An impact-modified homopolybutylene terephthalate from Degussa AG
Outer Layer (Layer V):
PA12: An impact-modified, plasticized polyamide from Degussa AG (VESTAMID® X 7293)
Polyolefin 2: as above EXAMPLES 1 to 5

Pipes having the dimensions 8×1 mm were produced at an extrusion velocity of about 12 m/min on a 5-layer unit equipped with two 45 mm extruders and three 30 mm extruders.

| Example | Inner layer = layer I | Layer II | Layer III | Layer IV | Layer V |
|---------|----------------------|----------|-----------|----------|---------|
| 1 | 0.1 mm of fluoropolymer 1 | 0.1 mm of BA 1 | 0.3 mm of PEL | 0.1 mm of BA 1 | 0.4 mm of PA12 |
| 2 | 0.1 mm of fluoropolymer 2 | 0.1 mm of BA 1 | 0.3 mm of PEL | 0.1 mm of BA 1 | 0.4 mm of PA12 |
| 3 | 0.1 mm of fluoropolymer 3 | 0.1 mm of BA 1 | 0.3 mm of PEL | 0.1 mm of BA 1 | 0.4 mm of PA12 |
| 4 | 0.1 mm of polyolefin 1 | 0.1 mm of BA 2 | 0.3 mm of PEL | 0.1 mm of BA 1 | 0.4 mm of PA12 |
| 5 | 0.1 mm of polyolefin 2 | 0.1 mm of BA 3 | 0.3 mm of PEL | 0.1 mm of BA 3 | 0.4 mm of polyolefin 2 |

Characterization of the Pipes:

In the pipes of Examples 1 to 5, the adhesion between the fluoropolymer or polyolefin inner layer and the polyester layer was so high that the composite could not be separated at this point, both when freshly extruded and after storage in fuel (internal contact storage using CM 15, a test fuel comprising 42.5% by volume of isooctane, 42.5% by volume of toluene and 15% by volume of methanol, at 80° C. with a weekly change of fuel, 1000 h).

The rupture rate in the low-temperature impact toughness test at −40° C. in accordance with SAE J 2260 was 0/10 for all pipes, both when freshly extruded and after storage in fuel (internal contact storage using CM 15 at 80° C. with a weekly change of fuel, 1000 h).

The description in priority application Germany 102004048777.4, filed Oct. 7, 2004, is hereby incorporated by reference.

The invention claimed is:

1. A multilayer composite comprising the following layers in order:
   I. an inner layer I selected from the group consisting of a fluoropolymer molding composition consisting of a fluoropolymer, a fluoropolymer molding composition consisting of a fluoropolymer and an electrically conductive additive, a polyolefin molding composition consisting of a polyolefin additive; and a polyolefin molding composition consisting of a polyolefin and an electrically conductive additive;
   II. a bonding layer II which has the following composition:
      a) from 2 to 80 parts by weight of a graft copolymer prepared from the following monomers: from 0.5 to 25% by weight, based on the graft copolymer, of a polyamine having at least 4 nitrogen atoms, and polyamide-forming monomers selected from the group consisting of lactams, ω-aminocarboxylic acids and equimolar combinations of diamine and dicarboxylic acid;
      b) from 0 to 85 parts by weight of a polyester, c) from 0 to 85 parts by weight of a polymer selected from the group consisting of polyamides, fluoropolymers and polyolefins, where the sum of the parts by weight of a), b) and c) is 100; d) not more than 50 parts by weight of one or more additives selected from the group consisting of impact-modifying rubber and customary auxiliaries and additives;
      a layer III of a polyester molding composition comprising a polyester and up to 40% by weight of another thermoplastic,
   wherein optionally, layer II or layer III or an additional inner layer additionally contains an electrically conductive additive.

2. The multilayer composite as claimed in claim 1, wherein the component II.a) is present in an amount of from 4 to 60 parts by weight and/or the component II.b) is present in an amount of from 10 to 75 parts by weight.

3. The multilayer composite as claimed in claim 1, wherein the component II.a) is present in an amount of from 6 to 40 parts by weight and/or the component II.b) is present in an amount of from 25 to 65 parts by weight.

4. The multilayer composite as claimed claim 1, wherein component II.c) is present in an amount of from 5 to 75 parts by weight.

5. The multilayer composite as claimed in claim 4, wherein component II.c) is present in an amount of from 10 to 65 parts by weight.

6. The multilayer composite as claimed in claim 4, wherein component II.c) is present in an amount of from 20 to 55 parts by weight.

7. The multilayer composite as claimed in claim 1, wherein inner layer I is a fluoropolymer molding composition, and the fluoropolymer is a fluoropolymer selected from the group consisting of PVDF, ETFE, ETFE modified by a third component, E-CTFE, PCTFE, THV, FEP and PFA.

8. The multilayer composite as claimed in claim 1, wherein inner layer I is a polyolefin molding composition, and the polyolefin is polyethylene or isotactic polypropylene.

9. The multilayer composite as claimed in claim 1, wherein the fluoropolymer or the polyolefin of inner layer I is adhesion-modified.

10. The multilayer composite as claimed in claim 1, wherein the polyester of the polyester molding composition of layer III is selected from the group consisting of polyethylene terephthalate, polypropylene terephthalate, polybutylene terephthalate, polyethylene 2,6-naphthalate, polypropylene 2,6-naphthalate and polybutylene 2,6-naphthalate.

11. The multilayer composite as claimed in claim 1, which additionally has a layer of a polyamide molding composition or a polyolefin molding composition which is joined via a bonding agent to the layer III.

12. The multilayer composite as claimed in claim 1, which is a pipe or a hollow body.

13. The multilayer composite as claimed in claim 1, which is a pipe which is corrugated in its entirety or in subregions.

14. The multilayer composite as claimed in claim 1, which is a fuel line, a brake fluid line, a cooling fluid line, a hydraulic fluid line, a filling station line, an air conditioner line, a vapor line, a container or a filling port.

15. The multilayer composite as claimed in claim 1, wherein one of the layers of the composite or said additional inner layer additionally contains an electrically conductive additive.

16. The multilayer composite as claimed in claim 1, which has been produced by coextrusion, coating, multicomponent injection molding or coextrusion blow molding.

17. The multilayer composite as claimed in claim 1, wherein the graft copolymer is prepared with additional use of an oligocarboxylic acid selected from the group consisting of about 0.015 to about 3 mol % of dicarboxylic acid and about 0.01 to about 1.2 mol % of tricarboxylic acid, based on the sum of the polyamide-forming monomers.

18. The multilayer composite as claimed in claim 1, wherein the polyamine has at least 11 nitrogen atoms and a number average molecular weight $M_n$ of at least 800 g/mol.

19. A method of forming a multilayer composite comprising subjecting inner layer I, bonding layer II, and layer III, of claim 1, to coextrusion, multicomponent injection molding or coextrusion blow molding.

20. A method comprising bonding an inner layer I to a layer III with a single bonding layer II therebetween, wherein the multilayer composite of claim 1 is formed.

\* \* \* \* \*